UNITED STATES PATENT OFFICE.

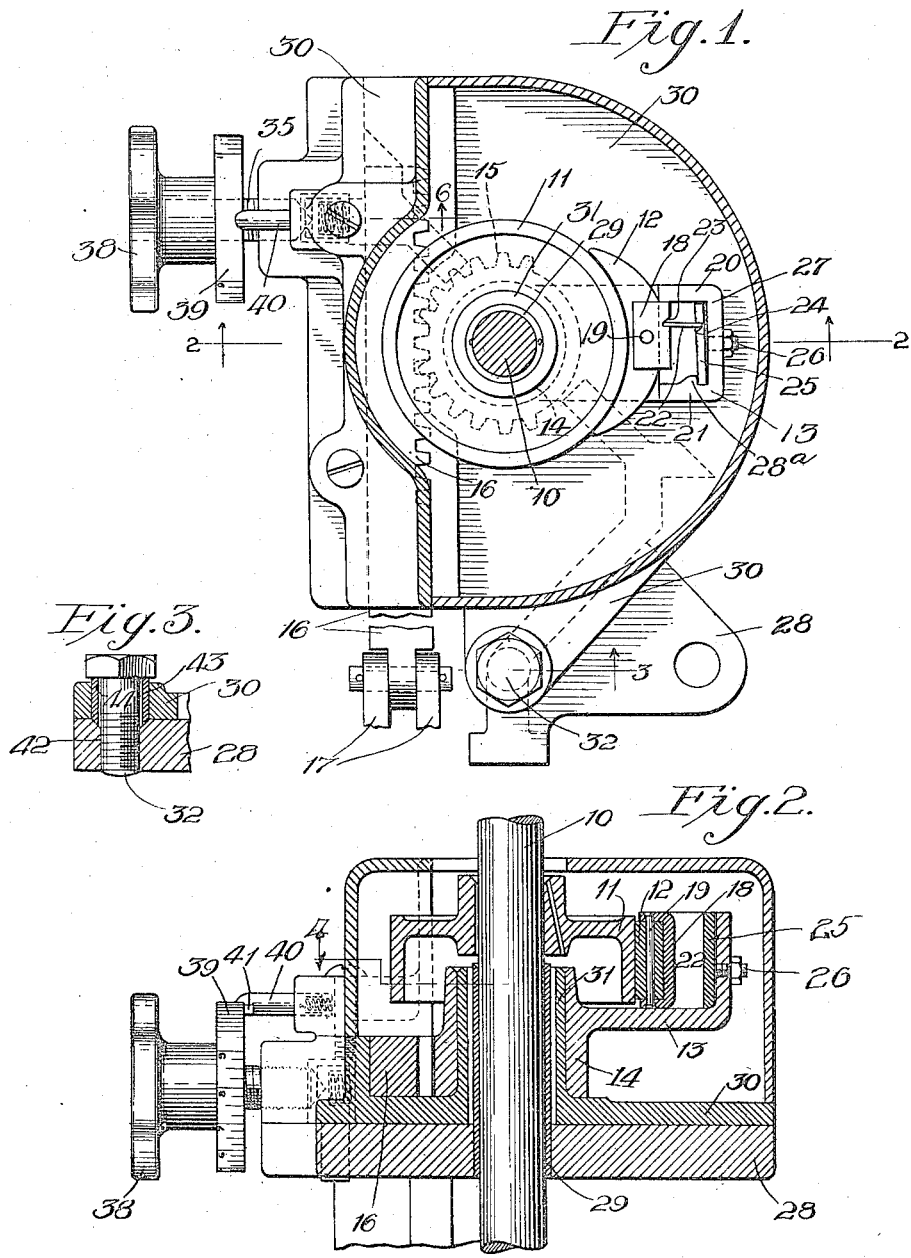

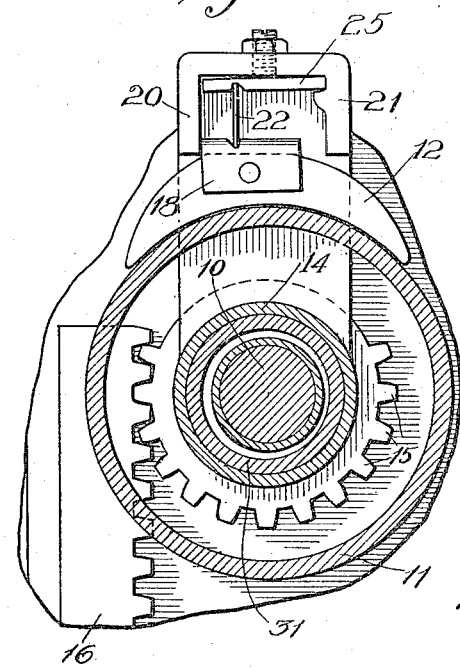
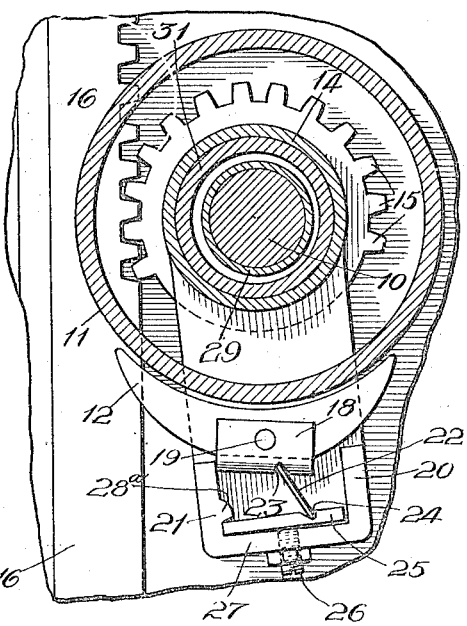

GEORGE J. BLUM, OF CHICAGO, ILLINOIS, ASSIGNOR TO ARMSTRONG-BLUM MANUFACTURING COMPANY, OF CHICAGO, ILLINOIS, A CORPORATION OF ILLINOIS.

FEEDING MECHANISM.

1,214,884.   Specification of Letters Patent.   Patented Feb. 6, 1917.

Application filed January 26, 1914. Serial No. 814,270.

*To all whom it may concern:*

Be it known that I, GEORGE J. BLUM, a citizen of the United States, residing at Chicago, in the county of Cook and State of Illinois, have invented certain new and useful Improvements in Feeding Mechanisms, of which the following is a specification.

This invention relates to improvements in the feeding mechanism of machine tools, and particularly such machine tools as have a cutter which is fed by a reciprocating movement such as is the case with some power hack-saws.

The exemplification of the invention which is herein illustrated and described refers more particularly to the power hack-saw which is described in my application for patent filed March 30, 1912, and designated as Serial No. 687,344, to which application reference may be made for a full description of the hack-saw and particularly of the feeding mechanism thereof.

One object of the invention is to provide feeding means for the saw which may be conveniently adjusted while the saw is in use so as to vary the rate of feed.

Another object of the invention is to provide feeding means which during the back stroke will be noiseless and without friction.

A further object of the invention is to provide feeding means which depends for its action upon friction, but is of such a nature that, ordinarily, it will act positively, but will slip, more or less, if for any reason the resistance to the feed becomes abnormally great.

In the accompanying drawings, Figure 1 is a plan view of a feeding mechanism which embodies the features of my invention, the protecting casing of the mechanism being in section. Fig. 2 is a sectional view of the mechanism along the line 2 of Fig. 1. Fig. 3 is a detail sectional view along line 3 of Fig. 1. Fig. 4 is an enlarged plan view, partly in section of the mechanism along the line 4 of Fig. 2, showing the operating mechanism at one of its limits of movement; and Fig. 5 is a similar view showing the operating mechanism at the other limit of its movement. Fig. 6 is a detail sectional view along the line 6 of Fig. 1, but on an enlarged scale; and Fig. 7 is a sectional view along the line 7 of Fig. 6.

The feeding of machine tools is usually accomplished by rotating in some manner a screw shaft; and in many cases this shaft is given an intermittent rotary movement by means of reciprocating mechanism. This is true with reference to the power hack-saw which I have described in the patent application referred to hereinabove. As will be seen by reference to said application, the feed screw thereof is intermittently rotated by means of a reciprocating friction device. It is to be understood, however, that the present improvement is applicable to any machine wherein the feeding is carried on by means of a reciprocating mechanism applied to a feed screw, or to any shaft which is to be rotated intermittently, for any purpose.

In the drawings of the present application, the feed screw shaft is indicated by the numeral 10. Fixed to this shaft is a friction drum 11. Adjacent to the periphery of this drum is a friction shoe 12 which is mounted in a bracket 13 fixed to a sleeve 14 which encircles the shaft 10. By means hereinafter described a reciprocating rotary movement is given to the sleeve 14 and thus to the bracket 13 and the shoe 12; and by other means to be described, the shoe is pressed firmly against the drum 11 when moving in one direction, but when moving in the opposite direction the pressure is removed; so that the drum, and hence the feed shaft, are actuated by the movement of the shoe in one direction only.

The following means are provided for giving to the shoe a reciprocating movement: Fixed to the sleeve 14 are teeth 15 which mesh in a slidable rack 16. Pivoted to one end of this rack is a lever 17, and this lever is given a reciprocating movement by means properly connected with the driving mechanism of the machine. As the lever 17 reciprocates, a corresponding reciprocating motion will be thus given to the shoe 12; and an intermittent rotation will be given to the drum 11 and the feed shaft 10 by the action of the shoe on the drum.

The following means are provided to produce operation of the friction drum by means of the shoe when the shoe is moving in one direction only: The shoe is preferably made of some material softer than metal, such as wood or fiber. In this instance I prefer hard maple. And the shoe is backed by a metallic plate 18, with its ends bent so as to inclose the shoe, and fixed to the shoe by means of the rivet 19. The shoe thus backed is mounted in the bracket 13 with the plate 18 projecting between the flanges 20 and 21 which rise vertically from the bracket 13, the plate 18, however, being materially narrower than the space between the two flanges, as is clearly indicated in Fig. 1. Neither the shoe 12 nor the plate 18 is directly connected to the bracket 13, but it will be seen that as the bracket reciprocates, reciprocating movement will be imparted to the shoe by means of the flanges 20 and 21; and that when the bracket, as viewed in Fig. 4, starts to move toward the right the plate will come in contact with the flange 20 and will remain so until the other extreme position shown in Fig. 5 is reached. When, however, movement of the bracket in the reverse direction takes place, the flange 21 will move into contact with the plate 18. So that a movement of the plate 18, and the shoe 12, with reference to the bracket, takes place at each change in direction of movement of the bracket.

In order to apply pressure to the shoe when it is moving in one direction, and to remove the pressure when it is moving in the other direction, I have provided a plate 22 which is placed vertically in the bracket 13 with one edge in a groove 23 of the plate 18 and the other edge in a groove 24 of a plate 25 which is adjustably mounted in the bracket 13. These grooves are so positioned that when the plate 18 is in contact with the flange 20, the two notches will be substantially radial with reference to the drum 11. But when the plate 18 is in contact with the flange 21 the two notches will be no longer radial. As a consequence, when the bracket 13 is rotating clockwise and plate 18 is against the flange 20, if plate 25 is properly adjusted, the shoe will be pressed firmly against the drum; but when the bracket is moving counter-clockwise plate 18 will be against the flange 21, and, because of the slanting position of the plate 22, the pressure on the shoe will be removed and no operation of the drum will result.

In order to suitably adjust the pressure of the shoe against the drum I have provided a screw 26 which is screwed into the rear flange 27 of the bracket 13 and presses against the plate 25. As the lug 28$^a$ prevents forward movement of one end of the plate 25, the other end, with the groove 24, may be pressed forward, by means of the screw 26, to any desired position.

In practice the operation is as follows: The driving mechanism, operating on the lever 17, imparts reciprocating motion to the bracket 13 by means of the rack 16 and the teeth 15. This causes the shoe 12 to have a reciprocating rotary movement with reference to the drum 11; and by means of the plate 22 movement of the shoe 12 in one direction only will cause rotation of the drum. It will thus be seen that a substantially positive intermittent feeding motion of the screw shaft 10 will result.

However, it will appear from this that the feeding movement given to the shaft would not thus be adjustable. Any adjustment of the set screw 26 would result merely in varying the frictional contact between the shoe and the drum during the operating movement of the shoe, so that there would be either insufficient pressure to operate the drum, or the drum would be operated during its entire movement in one direction of the shoe. As a consequence, in this way no variation in the amount of feeding would result.

But, as it is frequently desirable to adjust the amount of feeding with reference to the work which is being done, means for such adjustment have been provided, and consist of the following: The framework 28 of the machine supports the bearing 29 of the feed shaft 10; and rotatably mounted upon the frame 28 is a member 30. A sleeve 31 fixed to the member 30 encircles the shaft 10 and fits snugly within the sleeve 14 of the bracket 13. The bore of the sleeve 31, however, is materially larger than the outer diameter of the shaft bearing 29, which projects therethrough. So that the sleeve 31, so far as the bearing is concerned, is free to move and carry with it a material distance the bracket 13 and hence the shoe 12; and by such movement the position of the shoe with reference to the drum may also be changed. The member 30 is pivoted to the frame 28 by means of a pivot 32, and is free to swing thereon until the inner wall of the sleeve 31 comes in contact with the outer surface of the bearing 29.

In order to properly adjust the position of the sleeve 31 and thus of the shoe 12 with reference to the drum, the following means are provided: As is shown in Fig. 6, a recess 33 is provided in the member 30 into which projects the head 34 of a pin which is fixed to the frame 28. A screw 35 is threaded into the member 30 and the inner end thereof presses into a longitudinal groove 36 in the head 34. A spring 37 is placed between the head 34 and the wall of the recess 33 in the member 30. This spring at all times presses the member 30 away from the head, holding the end of the screw 35 snugly in contact with the wall of the recess 36.

It will be apparent that when the screw 35 is rotated by means of the disk 38, movement of the member 30 with reference to the frame 28 will take place. Referring to Fig. 1 it will be seen that, if the screw 35 is turned inwardly, the member 30, with reference to the shaft 10, will be moved toward the left, swinging on the pivot 32. This will cause the shoe 12 to move toward the drum 11; and the sleeve 14, and thus the axis of rotation of the shoe, with reference to the drum, will be eccentric, as is indicated in Figs. 4 and 5. Hence, as a consideration of Figs. 4 and 5 will show, when the bracket 13 is in either extreme position it will be farther from the drum periphery than when it is in the intermediate position. As a consequence the shoe, as it moves toward the intermediate position, will approach the drum periphery. It will be seen from this that by properly adjusting the screws 26 and 35, the shoe may be made inoperative for a certain portion of its operating stroke from the extreme position to the intermediate position. So that when the operating stroke takes place movement of the shaft will not occur until after the shoe has left the extreme position and is approaching the intermediate position; and movement of the shaft will cease before the shoe reaches the other extreme position. Thus, by adjusting the screw 35, the distance through which the shoe will be operative in passing clockwise from one extreme position to the other, may be adjusted, and hence the amount of feeding with each clockwise movement of the shoe may be controlled accordingly.

An index disk 39 is fixed to the screw 35 to assist in the proper adjustment of the amount of feed. When the indicating pin 40 is in contact with the stop 41, fixed to the disk 39, the member 30 is so positioned that sleeve 14 is concentric with the shaft, and hence the movement of the shoe 12 is concentric with the periphery of the drum. When in this position no feeding action will take place. If, however, the disk 39 is rotated so as to turn the screw 35 inwardly, the path of motion of the shoe will become eccentric with reference to the periphery of the drum; and when in the intermediate position indicated by Fig. 1, the friction of the shoe during a portion of its clockwise movement will be sufficient to rotate the drum. And the farther the stop 41 is moved away from the indicating pin 40 the greater the eccentricity of the movement of the shoe and the greater the feeding that will result. The pin 40 by means of a scale on the disk 39 indicates the proper setting of the screw 35 for the particular work to be performed. It will be seen that the feeding motion results from the relative eccentricity of the line of movement of the shoe 12 with respect to that of the drum, and when these lines come together the shoe picks up the drum, sooner or later according to the adjustment. If the parts were absolutely rigid this "crossing" of the lines of movement might wreck the apparatus, but there is sufficient spring in the plate 25 and arm 13 to permit the parts to operate as described. While the machine is operating the springing is hardly noticeable, but there is sufficient "give" to allow the parts to operate.

It will thus be seen that I have provided means for giving to the feed screw shaft an intermittent-rotating movement which is capable of being adjusted so that the feed may be varied from zero to a maximum. And the mechanism is such that the operation which is due to friction may be so adjusted as to be substantially positive in its action, or so as to allow a suitable tendency to slip if the nature of the work requires.

In order to maintain always the member 30 snugly in contact with the surface of the frame 28, I arrange the longitudinal recess 36 in the head 34 so that the upper surface only of the recess is in contact with the conical end of the pin 35. As the pin 35 is threaded into the member 30, this arrangement, together with the spring 37, tends to hold the member 30 always in contact with the frame 28.

In order to facilitate the proper machining and assembling of the parts so that the member 30 will always be in the position desired with reference to the frame 28, I countersink the aperture 42 into which the pivot 32 is threaded in the frame 28, and pass the pivot through a sleeve 43 forced into the aperture 44 of the member 30, through which the pivot 32 passes. The lower end of this sleeve is made conical so as to be guided into position by the conical walls of the upper end of the aperture 42; and as the bore of the sleeve 43 is substantially larger than the pivot 32, any slight error in position of the pivot in the threaded aperture 42 will not affect the relative positions of the member 30 and the frame 28, because such position will be determined by the sleeve 43 and the conical annular recess into which it passes.

In order to facilitate proper positioning of the pin 40 and the stop 41, I provide a frictional connection between the operating disk 38 and the indicating disk 39. The disk 39 fits snugly over the hub 45 of the disk 38, and a key 44$^a$ driven into a keyway 46 presses firmly against the hub, and allows relative rotation of the disks 38 and 39, but only by the use of much force. The screw 35 is firmly fixed in the hub 45, so that relative rotation of the disks allows suitable positioning of the pin 40 and the stop 41 in making the adjustment originally or in adjusting for wear of the shoe thereafter.

A spring 47 always maintains the shoulder 48 of the pin 40 in contact with the disk 39 no matter how much the screw 35 may vary the distance of the disk from the member 49 in which the pin 40 is slidably mounted, and which is fixed to the member 30.

Although I have described with much particularity the various features of the mechanism which form an exemplification of my invention, yet it is to be understood that various changes may be made therein without departing from the spirit of the invention as set forth in the following claims. And although I have disclosed mechanism applicable to a special form of power hack saw, yet the invention is equally applicable to various other machines and mechanical movements which require operation similar to that set forth.

I claim as my invention:

1. A feeding mechanism comprising a friction drum, a shoe reciprocatingly mounted adjacent to said drum, means for adjusting the position of said shoe with reference to said drum, means for imparting to said shoe a reciprocatory rotary movement, and means for changing the center of rotation of said movement with reference to the center of said drum.

2. A feeding mechanism comprising a feed shaft, a friction drum mounted on said shaft concentric therewith, a friction shoe movably mounted adjacent the periphery of said drum, means for imparting to said shoe a reciprocatory rotary movement, and means for varying the position of the axis of rotation of said shoe with reference to the axis of said drum while said mechanism is in operation.

3. A feeding mechanism comprising a shaft, a drum fixed to and concentric with said shaft, a friction shoe movably mounted adjacent to the periphery of said drum, means for imparting a reciprocating rotary motion to said shoe, means for varying the position of the axis of rotation of said shoe with reference to the axis of said drum, and means for pressing said shoe against said wheel during the central portion only of the movement.

4. A feeding mechanism comprising a framework, a friction drum journaled in said framework, a shoe movably mounted adjacent to the periphery of said drum, means for imparting to said shoe a reciprocatory rotating movement, and means for varying the position of the axis of rotation of said shoe with reference to the axis of said drum, said latter means comprising a member movably mounted upon said framework and supporting said shoe, and a screw threaded into said member, the end of said screw pressing against said framework.

5. A feeding mechanism comprising a drum, a friction shoe movably mounted adjacent to the periphery of said drum, means for imparting to said shoe a reciprocatory rotating movement, and means for varying the distance between said drum and said shoe, said latter means comprising a bracket movably supporting said shoe, a flange projecting upwardly from said bracket, a plate positioned edgewise substantially radial to said drum between said shoe and said flange, the respective edges of said plate being immovable with reference to said shoe and said flange, and means for producing relative movement of said shoe and said flange tangential to said drum.

6. The combination with a rotatable drum, of an oscillating shoe coöperating therewith, means to oscillate the shoe in an arc eccentric to the periphery of the drum, to intermittently grip the same, and means to vary the eccentricity of the arc of oscillation of the shoe, to vary the gripping engagement of the same with the drum.

7. A feeding mechanism comprising a framework, a friction drum journaled in said framework, a shoe movably mounted adjacent to the periphery of said drum, means for varying the distance between said drum and said shoe, means for imparting to said shoe a reciprocatory rotating movement, and means for varying the relative position of the axis of rotation of said shoe and the axis of said drum, said latter means comprising a member movably mounted upon said framework and supporting said shoe, and a screw threaded in the said member and pressing against said framework.

8. A feeding mechanism comprising a drum, a friction shoe movably mounted adjacent to the periphery of said drum, means for varying the distance between said drum and said shoe, means for imparting to said shoe a reciprocatory rotating movement, and means for varying the distance between said drum and said shoe when the said shoe changes its direction of rotation.

9. In a feeding mechanism, the combination of a rotatable friction drum, a shoe movably mounted adjacent to the periphery of said drum, means for imparting to said shoe a reciprocatory rotating movement, means for engaging the shoe with the drum on the forward stroke and disengaging the same on the back stroke, and means for varying the position of the axis of rotation of said shoe with reference to the axis of said drum.

10. A feeding mechanism comprising a drum, a friction shoe movably mounted adjacent to the periphery of said drum, means for imparting to said shoe a reciprocatory rotating movement, means for varying the distance between said drum and said shoe, said latter means comprising a bracket movably supporting said shoe, a flange projecting upwardly from said bracket, said bracket and said shoe each having a vertical groove, a plate positioned edgewise substantially radial to said drum with its respective edges in said grooves, and means for producing relative movement of said shoe and said flange tangential to said drum when said shoe changes its direction of rotation.

11. A feeding mechanism comprising a framework, a friction drum journaled in said framework, a shoe movably mounted adjacent to the periphery of said drum, means for varying the distance between said drum and said shoe, means for imparting to said shoe a reciprocatory rotating movement, and means for varying the position of the axis of rotation of said shoe with reference to the axis of said drum, said latter means comprising a member movably mounted upon said framework and supporting said shoe, and a screw threaded into said member, the end of said screw pressing against said framework.

12. A feeding mechanism comprising two revoluble adjacent members, means for imparting reciprocatory motion to one of said members along an arc substantially at right angles to a line passing through the centers of the paths of motion of said members, means for varying the distance between said members, further automatic means for varying the distance between said members when said reciprocating member changes its direction of movement, and means for adjusting while said mechanism is in operation the eccentricity of said paths of motion.

13. Mechanism of the character described comprising a rotary driven member, a driving shoe, an oscillatory bracket supporting said shoe, means acting intermittently to cause the shoe to engage the driven member in one direction of movement of the shoe only, and means for permanently adjusting the axis of oscillation of said bracket to bring the shoe into a different continuous relation to said driven member.

In testimony whereof I affix my signature in presence of two witnesses.

GEORGE J. BLUM.

Witnesses:
GEORGE L. CHINDAHL,
C. PAUL PARKER.

Copies of this patent may be obtained for five cents each, by addressing the "Commissioner of Patents, Washington, D. C."